United States Patent [19]

Amezcua et al.

[11] Patent Number: 4,604,710
[45] Date of Patent: Aug. 5, 1986

[54] SYSTEM FOR CONVERTING DATA PROCESSING INFORMATION TO TEXT PROCESSING FORMAT AND VICE VERSA

[75] Inventors: Robert Amezcua, Austin; Silous F. Clements, Georgetown; John S. Coenen, Austin; Ralph H. DaFoe, Austin; Michael N. Day, Austin; Dennis M. Ross, Austin; Richard O. Simpson, Austin, all of Tex.

[73] Assignee: International Business Machines Corporation, Armonk, N.Y.

[21] Appl. No.: 588,404

[22] Filed: Mar. 12, 1984

Related U.S. Application Data

[63] Continuation of Ser. No. 310,182, Oct. 9, 1981, abandoned.

[51] Int. Cl.[4] .................... G09G 1/10; G06F 3/023
[52] U.S. Cl. ................................ 364/900; 340/750
[58] Field of Search ............... 364/200, 900; 340/750, 340/724

[56] References Cited

U.S. PATENT DOCUMENTS

| | | | |
|---|---|---|---|
| 3,403,386 | 9/1968 | Perkins et al. | 340/172.5 |
| 3,560,936 | 2/1971 | Busch | 364/200 |
| 3,701,972 | 10/1972 | Berkeley et al. | 364/200 |
| 3,821,710 | 6/1974 | Arciprete et al. | 364/900 |
| 3,838,396 | 9/1974 | Martin | 364/900 |
| 4,038,640 | 7/1977 | Lee et al. | 364/200 |
| 4,110,823 | 8/1978 | Cronshaw et al. | 364/200 |
| 4,129,858 | 12/1978 | Hara | 340/324 |
| 4,130,882 | 12/1978 | Swanstrom et al. | 364/900 |
| 4,193,112 | 3/1980 | Gilbert et al. | 364/200 |
| 4,202,041 | 5/1980 | Kaplow et al. | 364/900 |
| 4,310,840 | 1/1982 | Williams et al. | 340/723 |

FOREIGN PATENT DOCUMENTS

0066674 3/1982 European Pat. Off. .
1363910 8/1974 United Kingdom .

OTHER PUBLICATIONS

Conference Proceedings, the 5th Annual Symposium on Computer Architecture, Apr. 3-5, 1978, pp. 39-43, IEEE Computer Society, New York, USA, L. A. Hollaar.

*Primary Examiner*—Gareth D. Shaw
*Assistant Examiner*—Daniel K. Dorsey
*Attorney, Agent, or Firm*—Douglas H. Lefeve; John W. Henderson, Jr.

[57] ABSTRACT

A method and control apparatus for operating an interactive text processing system wherein the system emulates a terminal for a data processing system which is capable of accessing information from the data processing system data base, copying the information into the text processing system memory, and automatically converting the information from the data processing system format into the text processing system format. Similarly, the text processing system is capable of converting information from its own data base from a text processing system format to a data processing system format and transmitting the information to the data processing system.

7 Claims, 5 Drawing Figures

SYSTEM FOR CONVERTING DATA PROCESSING INFORMATION TO TEXT PROCESSING FORMAT AND VICE VERSA

This is a continuation of application Ser. No. 310,182 filed Oct. 9, 1981, now abandoned.

TECHNICAL FIELD

This invention relates generally to information processing systems and, more particularly to automatic means and methods in a text processing system for converting input data from a data processing format to a text processing format and vice versa.

BACKGROUND ART

Prior art computer systems have traditionally been divided into systems programmed to do data processing functions and systems programmed to do word or text processing functions. The data processing field developed earlier and is directed to information processing where the primary purpose is to affect the value of the information being processed. Data processing typically involves mathematical and other computational operations such as ordering and sorting which affect the value or substance of the information. Generally, data processing has little concern with the format of the information except to the extent necessary to make the information readable or discernible to the operator either through a display or printer.

The more recently developing word processing or text processing field is directed to information processing where the primary purpose is to affect the formatting of alphanumeric data being processed with little or no regard for the value or substance of the information. Text processing typically involves formatting or arranging the information for printing into documents such as letters, text books, magazines, newspapers, etc., for dissemination to the public.

The substantial differences between data processing functions and text processing functions have traditionally led to independent technology development in the two fields and independent information processing equipment and programming for providing the functions. The data processing equipment has traditionally been more elaborate and more expensive than word processing equipment.

In recent years technology developments have greatly reduced the cost of information processing hardware. This has led to developments in the field of merging traditional data processing functions and traditional text processing functions into a single computer system. Concurrent with these developments has come the discovery that the most efficient utilization of the new integrated information processing systems requires the capacity to communicate with traditional data processing systems to take advantage of the large data bases stored therein.

DISCLOSURE OF THE INVENTION

The present invention discloses a method and means for operating an interactive text processing system wherein the system emulates a terminal for a data processing system that is capable of accessing information from the data processing system data base, copying the information into the text processing system memory, and automatically converting the information from the data processing system format into the text processing system format. Similarly, the text processing system is capable of converting information from its own data base to the format of the data processing system and transmitting the information to the data processing system.

In the data processing system terminal emulation mode, "screens" of information from the data processing system data base are displayed on the display of the text processing system. The word processing system operator has the option to interactively select blocks of information from the display for storage in the word processing system memory. The selection of information to be saved in the text processing system memory is accomplished by either saving the entire screen of data currently displayed or by selectively placing the display cursor at the boundaries of blocks of information within the screen to be saved. The selected information is then transferred from the display buffer into system storage. During the transfer the information is scanned for attributes peculiar to the data processing system such as field attributes and nulls. These are replaced with text processing space codes and carrier return codes are inserted at the end of each line. Once in the text processing system storage the information can be manipulated using any of the available word processing functions.

Information transmitted from the text processing system to the data processing system is stripped of text processing format codes prior to transmission.

BEST MODE FOR CARRYING OUT THE INVENTION

Figure 1:
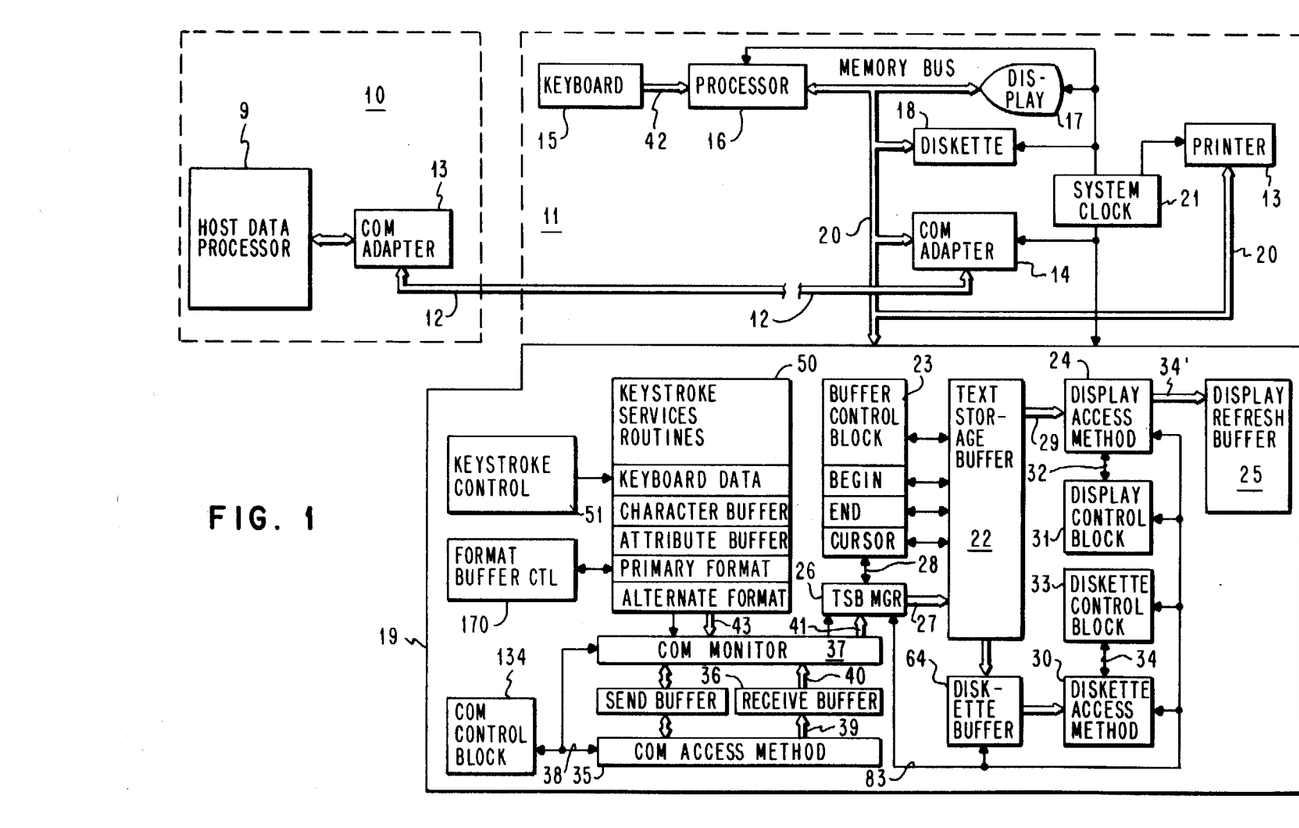
FIG. 1 is a logical block diagram showing the apparatus of a text processing system utilizing the present invention.

With reference to FIG. 1, a system in accordance with the present invention is shown. A text processing system 11 is connected to a remote data processing system 10 through communication adapters 13 and 14 and communication link 12. The communication adapters 13 and 14 may be any standard device having the capability, at the transmitting end, of converting parallel to serial data so that the data may be communicated over external telephone lines and, at the receiving end, for reconverting the received serial data into parallel form so that it may be handled by the receiving system. Such communication adapters will not be described in detail since they are not involved in the present invention which is directed to how transmitted data is reformatted once it is received at the text processing system.

In any event, the mode of communication over bus 12 which represents the link between the two systems is asynchronous serial communication. The communication adapter which can be used in the present invention is described in detail in copending application Ser. No. 274,300, filed June 16, 1981, by D. M. Benignus et al, and assigned to the assignee of the present invention. For purposes of describing the communications adapter, said copending application is hereby incorporated by reference.

In the present embodiment, the host data processor 9 may be any known data processing system, for example IBM System/370. The text processor 11, when in communication with the data processor 10 emulates a remote terminal of the data processor, for example the IBM 3270 terminal. The text processing system 11 operates as a conventional text processor when not in communication with the host data processing system 10. The text processing system may be programmed to switch back and forth between a text processing mode and data processing terminal emulation mode as described in copending application Ser. No. 310,184, filed Oct. 9, 1981 by S. F. Clements, et al, assigned to the present assignee. Application Ser. No. 310,184 is hereby incorporated herein by reference for the purpose of describing data processing system terminal emulation on a text processing system.

The text processing system operator accesses the text processing system through operator control keys on keyboard 15. The keyboard drives a processor 16 over bus 42. The processor 16 is operably interconnected into a visual display 17, a diskette 18, a printer 3, and a random access memory 19 by a memory bus 20. A system clock 21 is provided for timing functions within text processing system 11.

The information transmitted from data processor 10 to the text processor 11 is serially and asynchronously sent over bus 12 to communications adapter 14. Communications adapter 14 does a serial to parallel conversion of the input data and sends it over memory bus 20 to memory means 19 which has the capability of storing the received data and displaying it on visual display 17 as soon as it is received or at some subsequent times. Memory 19 includes a number of data areas and functional programs for operating with the data input into it through bus 20 from the communications adapter 14. The received data sent to memory 19 from communication adapter 14 over memory bus 20 is stored in text storage buffer 22 sequentially in the order in which it is received. The handling and updating of the data stored in text storage buffer 22 is controlled by routines stored within text storage buffer manager (TSB) block 26. These routines will be subsequently described further. A display access method program 24 controls the display of characters representative of the stored data on visual display screen 17 through display refresh buffer 25. The display refresh buffer 25 may operate in any conventional manner such as a raster scan cathode ray tube (CRT).

Text storage buffer (TSB) manager block 26 is connected to text storage buffer 22 by channel 27. The text storage buffer manager block 26 is further connected to buffer control block 23 through a channel 28. As previously indicated, the data representative of the characters is input into buffer 22. The data representative of characters is stored sequentially in text storage buffer 22 in the order in which it is received. The data received from the host data processor includes character data and attribute data peculiar to the data processor such as record length, record format, null, etc. Only those characters recognizable as text characters are displayed on the word processing system display. In displaying the characters, text character data stored in buffer 22 is communicated to display access method 24 over channel 29. It should be noted that corresponding diskette access method block 30 is used instead of display access method block 24 when communication between the text storage buffer 22 and the diskette 18 is desired.

A display control block 31 is connected through a channel 32 with display access method block 24. The corresponding diskette control block 33 communicates with diskette access method block 30 over channel 34 when access to the diskette drive is required.

In any event, as soon as the information from communication adapter 14 is received by the text storage buffer 22, this information is transmitted over channel 29 to display access method 24 and then via channel 34 to display refresh buffer 25. The information stored in display refresh buffer 25 is representative of the actual alphanumeric information shown on display 17. The display control block 31 serves to store flags and status information as required by the operation of display access method block 24.

It should be noted that we previously described received data being transferred from the communication adapter 14 to the text storage buffer 22 over bus 20. Actually the process involves several steps. Information from communication adapter 14 is put on to bus 20 which takes the data to communication access method block 35 under the direction of communication control block 134 after which the data is input over channel 39 to receive buffer 36 and then over channel 40 to communications monitor 37. Information from the communications monitor 37 is input over channel 41 to text storage buffer manager block 26 previously described. Then the data is input to the text storage buffer 22 over channel 27 under the direction of buffer control block 23.

Since the operator controls processes being described through a keyboard 15 communicating through processor 16, standard keyboard entry processes should be described. As the operator enters each keystroke at the keyboard 15, a corresponding signal is transmitted through channel 42 to processor 16 which enters the keystroke command into the memory 19. In the memory, upon the receipt of a keystroke command, a keystroke routine is produced for keystroke service routine block 50 to handle the particular command received. This is carried out under the control of keystroke control block 51. The keystroke command is then processed via channel 43 through communications monitor 37 and channel 41 to the text buffer storage manager block 26 which has the program to control buffer control block 23 to carry out various processes with respect to the data stored in the text storage buffer 22.

Using the hardware just described in FIG. 1, the processes of handling the received data in accordance with the present invention will now be considered. As was previously stated, when the text processing system 11 operates in a data processing system terminal emulation mode, data received from the host data processor is stored in the text storage buffer 22 of the memory 19. The data processing information includes coded information that is peculiar to the data processing system and is not part of the text processing system's normal character set. The peculiar data processing system information relates to control codes such as field attributes and nulls. The normal alphanumeric character set and special character set, e.g. *, ;, (,), etc. are common between the two types of systems. The data processing system information stored in the text storage buffer 22 is passed over bus 29 to the display access method 24 for placement into the display refresh buffer 25. The information is then made visible to the operator through display 17.

When the text processing system 11 is operating in a data processing terminal emulation mode the information in memory and on the display 17 can be altered through the keyboard 15 only as allowed by the host data processor 9.

If the text processing system operator desires to alter the information beyond what is allowed by the host data processor or desires to retain the data processing system information being displayed, the information must be copied from the data processing screen storage and converted to a text processing format. The text processing system must then be switched to a text processing system mode before the information can be manipulated.

Figure 2:
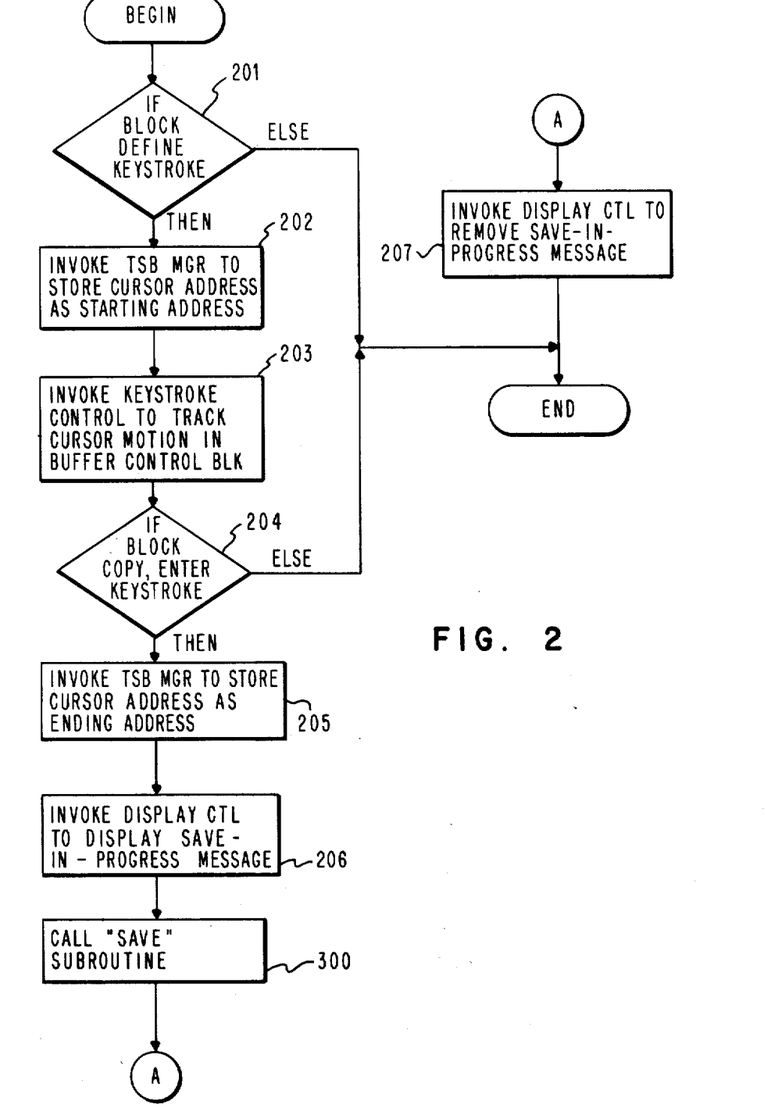
FIG. 2 is a flow diagram of the routine for initiating a conversion of the information being displayed.

Referring now to FIG. 2, in order to copy information from the data processing screen, the operator places the display cursor at the start of the data to be copied. This is accomplished through cursor control keys located in the keyboard and operable in the data processing terminal emulation mode as was previously stated. When the cursor has been placed at the beginning of the information segment to be saved, the operator depresses a block define key on the keyboard which is recognized at block 201 in FIG. 2. When the block define keystroke is inserted by keystroke control 51 into the keystroke services routine 50, the text storage buffer manager 26 is invoked at block 202 to store the present cursor address as the starting address of the data processing information to be copied. At block 203 keystroke control 51 tracks cursor motion in the buffer control block 23 as the cursor is advanced through keyboard 15 to the end of the information segment to be copied. When the cursor has been placed at the end of the information segment to be copied the operator must depress either a block copy key and/or an enter key at block 204 if the system recognizes either one of these keys then the text storage buffer manager 26 is invoked at block 205 to store the present cursor address as the ending address of the information segment to be copied. If neither the block copy key nor enter key is depressed at block 204 the routine will be ended. Assuming that the proper keystrokes are entered, the text storage buffer manager 26 will invoke the display control block 31 through bus 83 to display a "save-in-progress" message in block 206 on the message line of display 17. Alternatively, display 17 may include a light that is adjacent a fixed "save-in-progress" message and the display control block 31 may be invoked to turn on this light.

Figure 3:
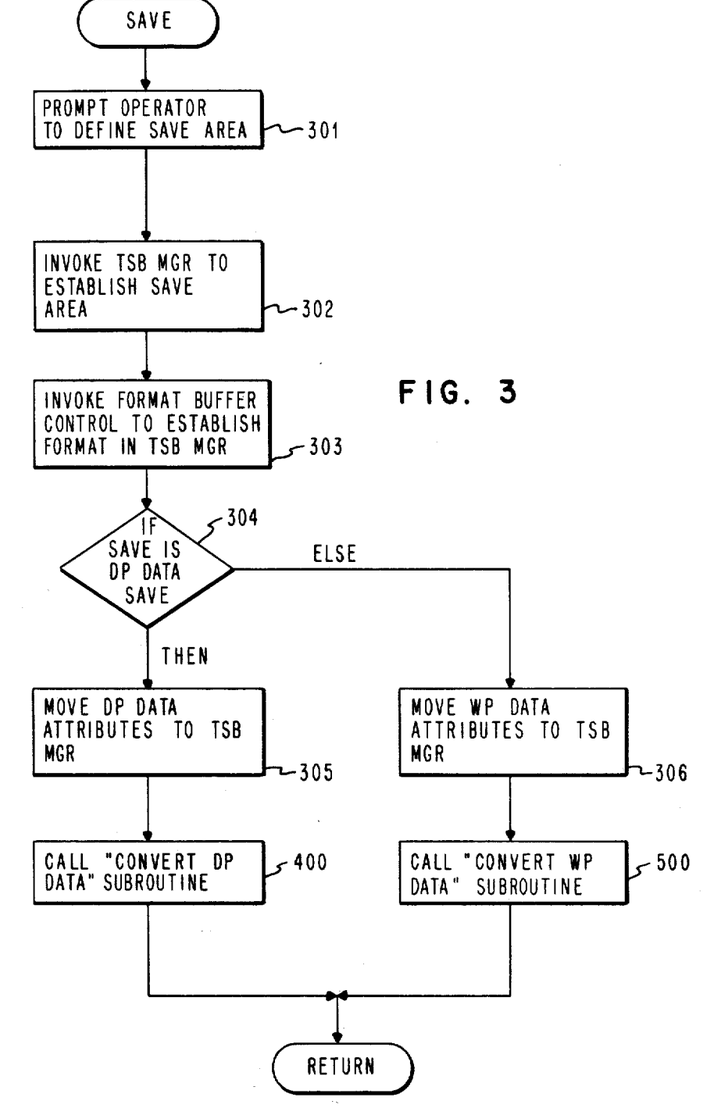
FIG. 3 is a detailed flow diagram of the subroutine for saving the display contents of FIG. 2.

Following display of the "save-in-progress" message, a "SAVE" subroutine is called at block 300 to process setup for the area in which the information to be converted will be stored. Referring to FIG. 3 the SAVE subroutine prompts the operator through a message entered from the display control block 31 to the display screen 17 to input a code defining an area in which the saved information is to be stored. The implementation of the save area definition may take the form of a predetermined number of storage areas of a predetermined length, for example, 2000 bytes of storage, any one of which can be invoked by the operator entering a code name or code number from the keyboard. Conversely, the save areas may be defined as having variable lengths determined by the length of the data to be saved. In the preferred embodiment, nine save areas of variable length are predefined and can be invoked by the operator entering a numeric identifier of 1 through 9. This prompt is implemented with a default selection of save area number one if the operator fails to specify another save area number. When the operator enters a proper response in block 302, the text storage buffer manager is invoked to establish the block of storage in the text storage buffer 22. In block 303, the format buffer control 170 is invoked to establish formatting information in the text storage buffer manager from the format buffers in the keystroke services routine 50. The format storage buffers provide storage for the operator to enter a primary format and an alternate format to be used in processing information to be stored or displayed. The format information includes text processing control codes such as carrier returns and line lengths. This information is keyed and prestored in the format buffers while the system is in a text processing mode.

Once the format information has been stored in the text storage buffer manager 28, the mode of the text processing system 11 is tested to determine if it is in a text processing mode or a data processing terminal emulation mode. As was previously stated, the text processing system 11 is capable of operating under program control in either a standard text processing mode or a data processing terminal emulation mode in which it is connected through a communications line to a host data processing system 10. Assuming that the system is operating in a data processing system terminal emulation mode then at block 305 the SAVE subroutine will transfer the data processing data attribute codes from the attribute buffer in keystroke services 50 to the text storage buffer manager 26. These data processing data attribute codes define the characters that are peculiar to the data processing system such as nulls and field identification codes as was previously discussed. Then in block 400 the SAVE subroutine transfers control to the "CONVERT DP DATA" subroutine which is shown in FIG. 4.

Figure 4:
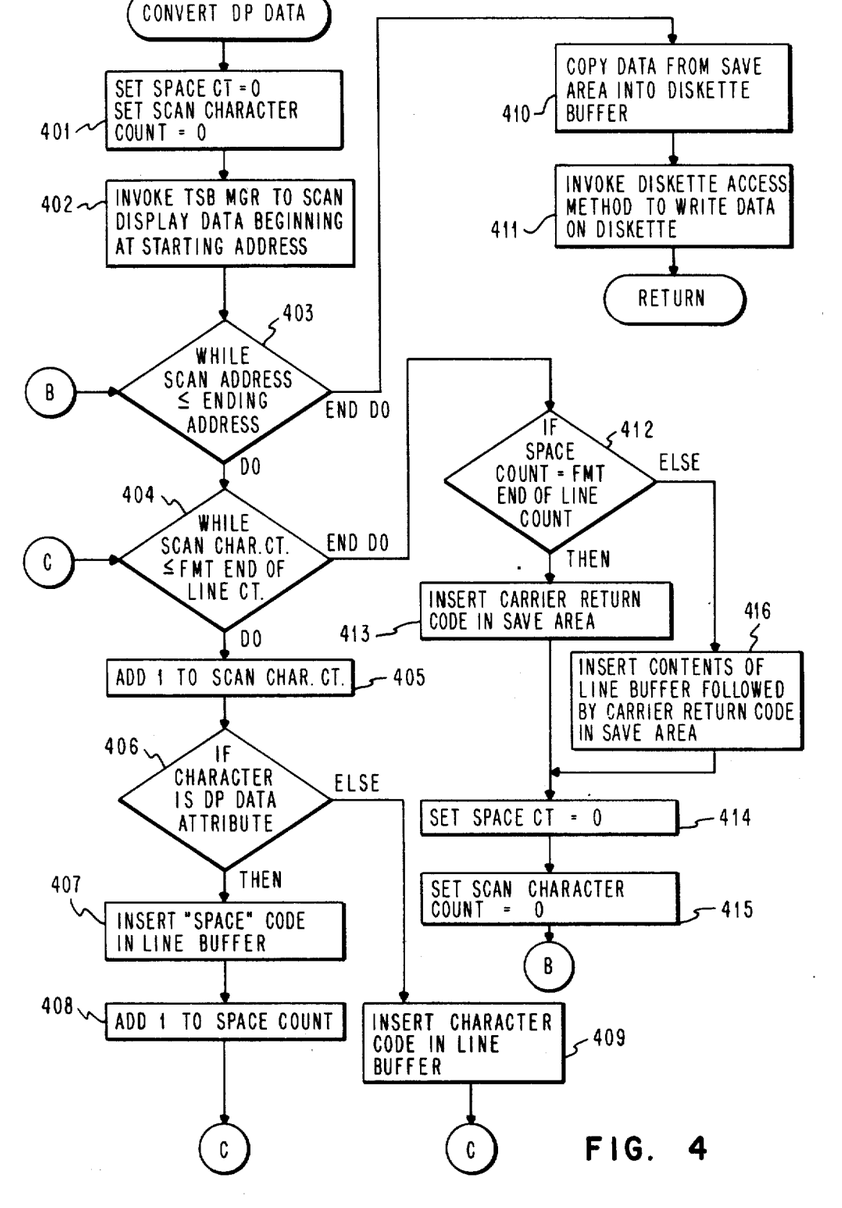
FIG. 4 is a flow diagram of the subroutine for converting DP data to text processing data format.

Referring now to FIG. 4, the CONVERT DP DATA subroutine sets the space code counter and scan character count counter equal to zero in block 401. In block 402 the text storage buffer manager 28 is directed to scan the DP data stored in the text storage buffer 22 beginning at the starting address which was established in block 202 of FIG. 2. The scan is executed on a character by character basis with the address of each character being compared to the established ending address in block 403. As each character is processed before the ending address is reached the count of the characters is accumulated in block 405 and compared to the maximum line count that was established in the format established in the text storage buffer manager in block 303 of FIG. 3. Each scanned character is tested to determine if it is a DP data attribute such as a null in block 406. If the character is a DP data attribute then it is replaced in block 407 by a word processing "space" code in the line buffer where the characters are being inserted. Then, one is added to a counter in block 408 which keeps track of the number of accumulated space codes. If the character is determined not to be a data processing data attribute code then the character is assumed to be of the character set common to both types of systems and the character code is inserted into the line buffer in block 409.

The subroutine continues to process characters into the line buffer and accumulate a count until the number of characters equals the line length limits set by the format. When the line length limit is reached a branch is taken to block 412 where the total count of spaces in the line is compared to the maximum line length count. If the line turns out to be all spaces then a carrier return code is inserted in the save area rather than inserting an entire line of space codes. This will provide a blank line when the information is either printed or displayed by the system in a text processing mode and prevents unnecessarily using memory space. If the space code count does not equal the line length count then the line must contain some text characters and the entire contents of the line buffer are inserted into the save area followed by a carrier return code in block 416. The space count counter is then set to zero in block 414 and the character count counter is set to zero in block 415 and the system is ready to process a new line of data in block 403.

When the scan address exceeds the end address in block 403 the last data in the block defined to be saved has already been processed. A branch is taken to block 410 where the information is copied from the save area into the diskette buffer 64. In block 411 the diskette access method 30 is invoked to write the data from diskette buffer 64 onto the diskette 18. Control is then returned to the save routine in FIG. 3 where it is returned to main routine in FIG. 2 in block 300. Referring back to FIG. 2 in block 207 the display control block 31 is invoked to remove the "save-in-progress" message from the display message line and the routine ends.

When the text processing system 11 is operating in a text processing mode and data is displayed which the operator desires to convert to a data processing format for transfer to the data processing system, the operational sequence of the system is identical to that described above until processing reaches block 304 in FIG. 3. In block 304 if it is determined that the system is in a text processing mode, then a branch is taken to block 306 wherein the WP data attribute codes are transferred from the attribute buffer in keystroke services routines 50 to the text storage buffer manager 26. The WP data attribute codes are defined as the text format control codes such as carrier return, space, tab, etc. that are included in the normal text data stream along with the standard alphanumeric character codes. In block 500 the subroutine to convert the WP data to DP data by removing the text processing format control codes and inserting corresponding data processing field attribute codes is called. This subroutine is shown in FIG. 5.

Figure 5:
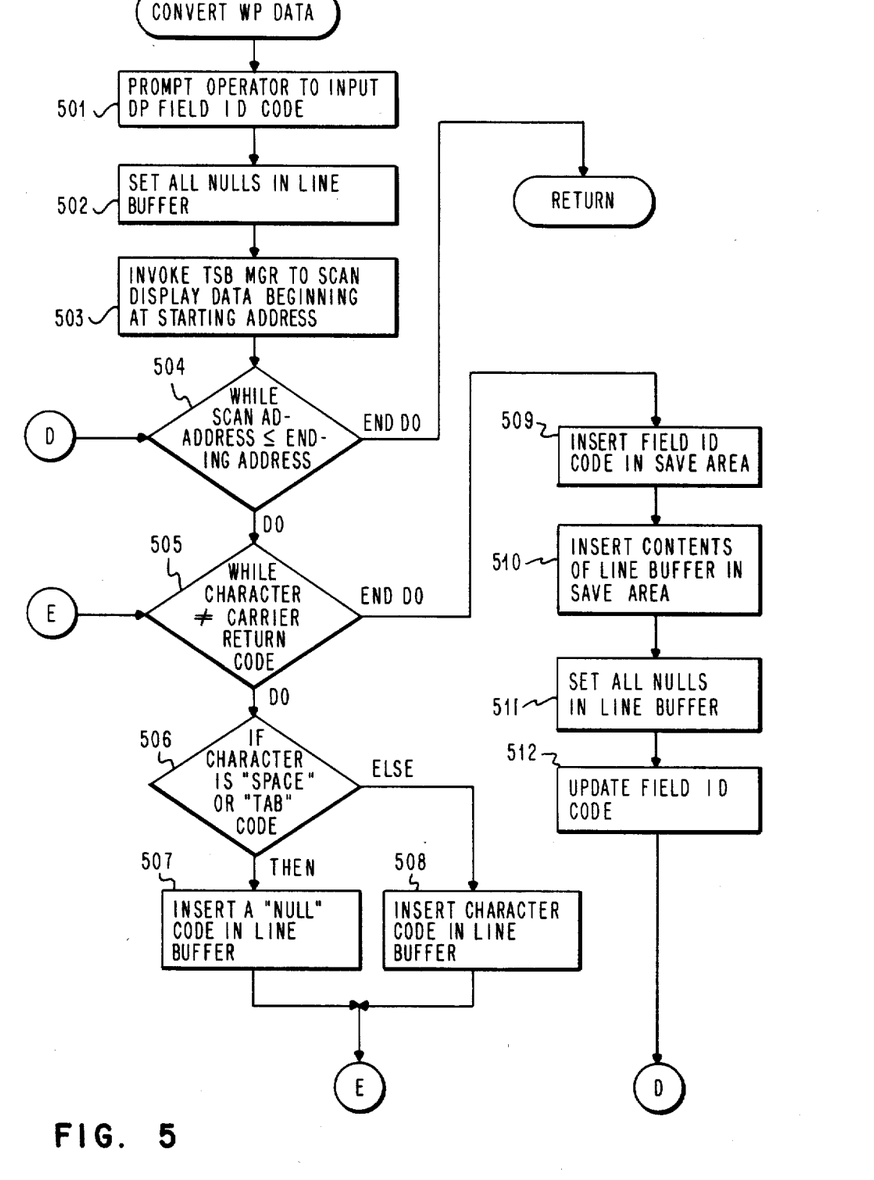
FIG. 5 is a flow diagram of the subroutine for converting WP data to data processing format.

Referring to FIG. 5, in block 501 the subroutine prompts the operator to input data processing field identification codes which are peculiar to the particular data processing system to which the data will be transferred. After the operator inserts this code through the keyboard, in block 502 the line buffer is set to all "null" data processing characters. In block 503 the text storage buffer manager 26 is invoked to scan the display data in the text storage buffer 22 beginning at the starting address as was previously described. The characters are then scanned sequentially beginning at the starting address. While the scan address is less than the preset ending address in block 504 each character is tested to determine if it is a carrier return code in block 505. If the character is not a carrier return code then in block 506 the character is tested to determine if it is a "space" code or a "tab" code. If the character code is a space or tab then in block 507 a "null" code is inserted in the line buffer and a branch is taken back to block 505 to process the next character. If the character code is not a space code or tab code, a branch is taken from block 506 to block 508 wherein the character code is inserted in the line buffer. Then a branch is taken back to block 505 to test the next character.

When a carrier return code is encountered in block 505 a branch is taken to block 509 wherein the field identification code is inserted into the save area. In block 510 the contents of the line buffer are inserted into the buffer save area adjacent to the field identification code. Since the line buffer was initially set to all null codes in block 502, if the first character encountered is a carrier return code the data processing field will be established as a line of all null characters. If the text characters in the line do not extend to the end of the line then whatever character positions remain following the encounter of a carrier return code will contain nulls. In block 511 the line buffer is once again set to all nulls and the field identification code is updated in block 512. Processing is then transferred back to block 504 wherein the scanning of addresses continues.

When the scan address exceeds the ending address the last data character specified for the block by the operator in FIG. 2 has been processed. A branch is taken by block 504 to return processing to block 500 in FIG. 3 which then returns processing to block 300 in FIG. 2. Once again the display control block 31 is invoked to remove the "save-in-progress" message from the display message line in block 207 and processing ends.

The data thus converted to a data processing format while in the text processing mode remains in the text storage buffer 22. The operator is then free to switch the system to a data processing terminal emulation mode as described in the copending application Ser. No. 310,184, for transferring the information from the text processing system 11 to a host data processing system 10 as described above. Likewise, data converted to a text processing format and stored on diskette while in the data processing terminal emulation mode may be processed as text processing data when the system is switched to a text processing system mode.

While the invention has been particularly shown and described with reference to a preferred embodiment it will be understood by those skilled in the art that various other changes in form and detail may be made without departing from the spirit and scope of the invention.

We claim:

1. In an information processing system capable of conducting data processing operations wherein data information including one or more alphanumeric character codes and an attribute code is stored in a data processing field format and the data processing affects the substance of the data information and capable of conducting text processing operations wherein text information is stored in a text processing string format having strings of text codes intermixed with format codes and the text processing affects the arrangement of the text information, the improvement for converting data information in said data processing field format to text information in said text processing string format comprising:

means for storing data information in said data processing field format;

means connected to said means for storing for converting the stored data information in said data processing field format to text information in said text processing string format;

said means for converting the stored data information including means, connected to said means for storing, for scanning said data information after said data information has been stored;

means, connected to said means for scanning, for testing each of said codes of said stored data information to detect said attribute code; and means, connected to said means for storing and said means for testing, for replacing said attribute code with a space code.

2. In an information processing system capable of conducting data processing operations wherein data information including one or more alphanumeric character codes and an attribute code is stored in a data processing field format and the data processing affects the substance of the data information and capable of conducting text processing operations wherein text information is stored in a text processing string format having strings of text codes intermixed with format codes and the text processing affects the arrangement of the text information, the improvement for converting data information in said data processing field format to text information in said text processing string format comprising:

means for storing data information in said data processing field format;

means, connected to said means for storing, for displaying the stored data information;

means connected to said means for displaying for defining a block of data information within the stored data information;

means responsive to said means for defining for converting the defined block of data information in said data processing field format to text information in said text processing string format;

said means for converting the stored data information including means, connected to said means for storing, for scanning said data information after said data information has been stored;

means, connected to said means for scanning, for testing each of said codes of said stored data information to detect said attribute codes; and means, connected to said means for storing and said means for testing, for replacing said attribute code with a space code.

3. In an information processing system capable of conducting data processing operations wherein data information including alphanumeric character codes and attribute codes is stored in a data processing field format and the data processing affects the substance of the data information and capable of conducting text processing operations wherein text information is stored in a text processing string format having strings of alphanumeric codes intermixed with a format code and the text processing affects the arrangement of the text information, the improvement for converting text information in said text processing string format to data information in said data processing field format comprising:

means for storing text information in said text processing string format;

means connected to said means for storing for converting the stored text information in said text processing string format to data information in said data processing field format;

said means for converting the stored text information including means, connected to said means for storing, for scanning said text information after said text information has been stored;

means, connected to said means for scanning, for testing each of said codes of said stored text information to detect said format code; and means, connected to said means for storing and said means for testing, for replacing said format code with a null code.

4. In an information processing system capable of conducting data processing operations wherein data information including alphanumeric character codes and attribute codes is stored in a data processing field format and the data processing affects the substance of the data information and capable of conducting text processing operations wherein text information is stored in a text processing string format having strings of alphanumeric codes intermixed with a format code and the text processing affects the arrangement of the text information, the improvement for converting text information in said text processing string format to data information in said data processing field format comprising:

means for storing text information in said text processing string format;

means connected to said means for storing for displaying the stored text information;

means connected to said means for displaying for defining a block of text information within the stored text information;

means responsive to said means for defining for converting the defined block of text information in said text processing string format to data information in said data processing field format;

said means for converting the stored text information including means, connected to said means for storing, for scanning said text information after said text information has been stored;

means, connected to said means for scanning, for testing each of said codes of said stored text information to detect said format code; and means, connected to said means for storing and said means for testing, for replacing said format codes with a null code.

5. In an information processing method for conducting data processing operations wherein data information including one or more alphanumeric character codes and an attribute code is stored in a data processing field format and the data processing relates to the substance of the data information and for conducting text processing operations wherein text information is stored in a text processing string format having strings of text codes intermixed with format codes and the text processing relates to the arrangement of the text information, the improvement for converting data information in said data processing field format to text information in said text processing string format comprising the steps of:

storing data information in said data processing field format;

converting the stored data information in said data processing field format to text information in said text processing string format;

said step of converting the stored data information including scanning said data information after said data information has been stored;

testing each of said codes of said stored data information to detect said attribute code; and replacing said attribute code with a space code.

6. In an information processing method for conducting data processing operations wherein data information including alphanumeric character codes and attribute codes is stored in a data processing field format and the data processing relates to the substance of the data information and for conducting text processing operations wherein text information is stored in a text processing string format having strings of alphanumeric codes intermixed with a format code and the text processing relates to the arrangement of the text information, the improvement for converting text information in said text processing string format to data information in said data processing field format comprising the steps of:

storing text information in said text processing string format;

converting the stored text information in said text processing string format to data information in said data processing field format;

said step of converting the stored text information including scanning said text information after said text information has been stored;

testing each of said codes of said stored text information to detect said format code; and replacing said format code with a null code.

7. The improvements of claim 3 or claim 4 further comprising:

means for receiving an operator entry of a field identification code; and means, connected to said means for receiving, said means for testing, and said means for storing, and upon the detection of a carrier return format code, for inserting said field identification code into said means for storing along with said information stored in said text processing string format.

* * * * *